United States Patent Office 3,377,421
Patented Apr. 9, 1968

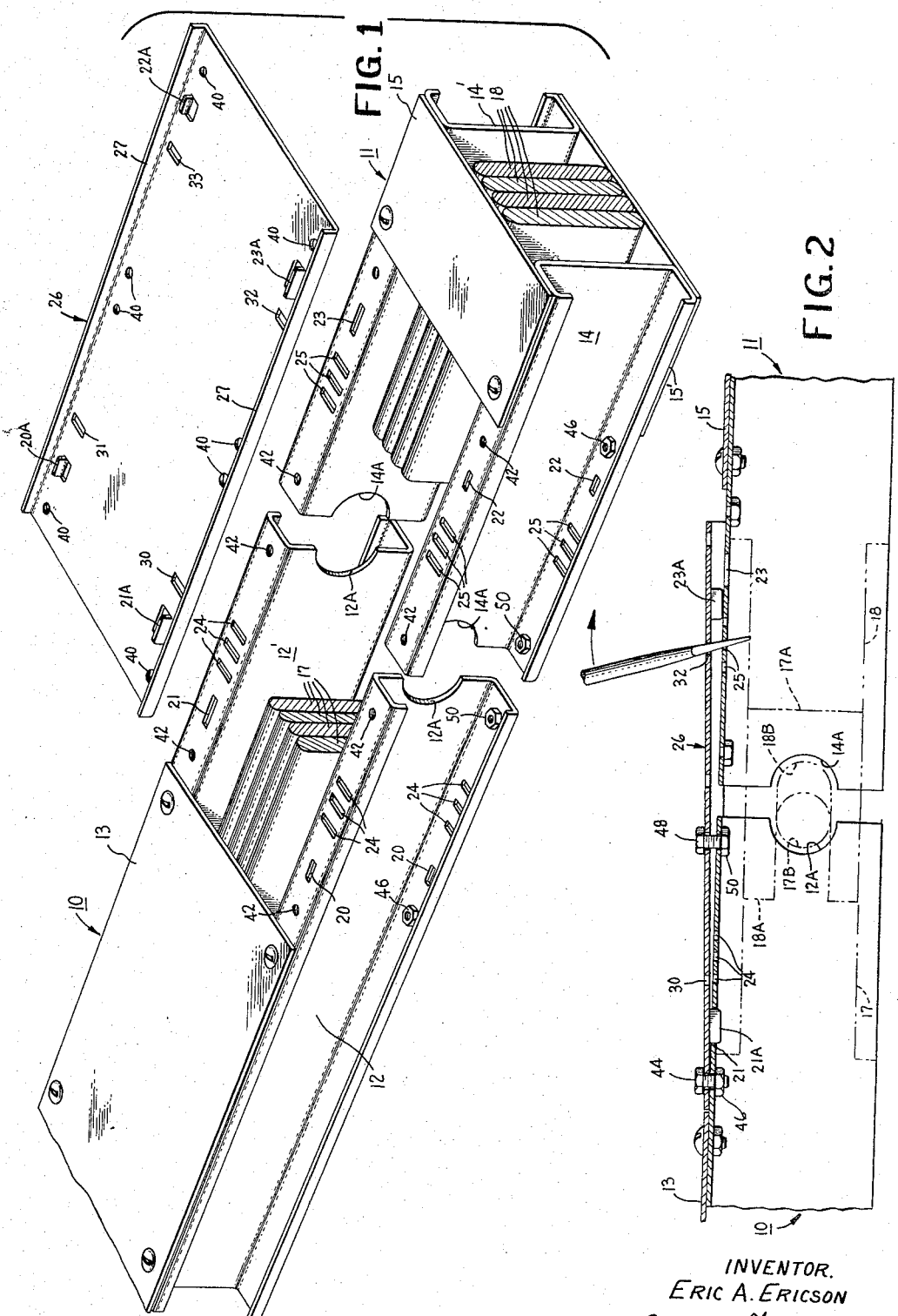

3,377,421
ELECTRIC POWER BUSWAY SYSTEM WITH NOVEL CONNECTING MEANS FOR JOINING BUSWAY SECTIONS
Eric A. Ericson, Plainville, Conn., assignor to General Electric Company, a corporation of New York
Filed Aug. 5, 1966, Ser. No. 570,594
5 Claims. (Cl. 174—84)

ABSTRACT OF THE DISCLOSURE

An electric power busway system including a plurality of elongated metallic housing sections having electric power busbars supported in insulated relation therein; a joint cover including portions overlapping corresponding endwise adjacent portions of adjacent housing sections in the manner of a splice-plate; the joint cover being provided with holes and tabs at each end, there being corresponding holes provided in the adjacent portions of the housing sections; with one end of the joint cover attached to one of the housing sections, a screwdriver or similar tool is inserted into corresponding holes in the free end of the joint cover and in the other of the section housings in order to "jack" the two section housings into proper position whereupon they may be secured in place.

Background of the invention (1) *Field of the invention.*—My invention relates to electric power busway systems, and more particularly to busway systems including prefabricated lengths of busway, each length comprising a metallic housing or duct and busbars supported in insulated relation therein, and connecting means for joining such prefabricated sections together.

(2) *Description of the prior art.*—Electric power busway systems of the type described made up of prefabricated sections of metallic duct with busbar conductors supported therein, are of substantial size and weight. For example, a typical busway rated at 400 amperes is made up of sections each 10 feet long and weighing approximately 100 pounds. Such busway systems are usually installed in an elevated position in a building, and substantial effort is required to properly align and adjust succeeding length of such busway so as to permit their connection, such as by bolting.

Such busway housing lengths are ordinarily brought together in end-to-end substantially abutting relation, and mechanically and electrically interconnected. In the type of busway to which the present invention relates, the mechanical connection between the housings is preferably made first, since the electrical connection is made by means of a single bolt passing through all the overlapped pairs of corresponding busbar ends after the housings are brought into proper alignment.

In accordance with common prior art practice, various mechanical fixtures or other means have been resorted to in order to properly adjust the busway sections lengthwise with respect to each other in order to permit the final mechanical connection. Thus mechanical clamping means have been utilized, including portions hooking into holes in the adjacent busway section ends and mechanical means such as screw means have been used for drawing the sections together. Similarly, "racking" or "jacking" mechanisms have been applied for similar purposes.

Such adjusting mechanisms have been cumbersome and awkward to use, and in addition, the need for carrying them to the elevated location where each connection must be performed, and subsequent transportation to the next location, and so forth, has been bothersome and time-consuming.

Object of the invention

It is an object of the present invention to provide an electric power busway system of the type including prefabricated elongated sections which may be readily adjusted in a lengthwise direction without the need of special clamping or jacking devices and by the use of simple conventional tool means, such as a screwdriver or pry-bar.

It is another object of the invention to provide an electric power busway system of the type described including means for making the required lengthwise adjustment of the busway sections while in their installed elevated condition by the use of simple conventional tool means, and means for automatically retaining said busway sections in the properly adjusted position when this is achieved, thereby facilitating the final permanent interconnection of the busway sections.

Summary of the invention

In accordance with the invention in one form, an electric power busway system is provided including a plurality of elongated metallic housing sections having electric power busbars supported in insulated relation therein. Joint cover means is provided which includes portions overlapping corresponding endwise adjacent portions of the housing sections in the manner of a splice-plate. The busway section and cover include means whereby the cover may be attached to one of the housing section lengths adjacent the end thereof. The housing joint cover and the other of the section housing ends are provided with a plurality of spaced openings at least some of which are in register when the busway sections are in their desired adjusted relation. When the busway sections are away from the desired final adjusted relation, a tab on the joint cover keeps it spaced from the corresponding surface of the second section. A conventional tool means such as a screwdriver or pry-bar may be inserted through an aperture in the joint cover and into the slightly offset corresponding aperture in the busway section housing, and a substantial leverage may be applied to pull the busway sections toward each other. Because of the separation between the cover and the second busway section housing, the screwdriver may be reinserted in the cover aperture at a different angle to engage the next succeeding aperture in the second section housing and the prying action repeated.

In accordance with another aspect of the invention, the housing joint cover includes means interlocking with portions of the busway section housing other than the housing to which it is initially attached such that when the housings are in their finally desired adjusted position, such interlocking means may become "automatically" interengaged thereby holding the busway housings in the adjusted position.

The invention will be more fully understood from the following detailed description, and its scope will be pointed out in the appended claims.

Brief description of the drawings

In the drawing:
FIGURE 1 is a perspective view of a portion of a busway system incorporating the invention; and
FIGURE 2 is a longitudinal section view of the apparatus of FIGURE 1 in the process of installation.

Description of a preferred embodiment

As illustrated, the busway system of FIGURE 1 includes a pair of elongated busway sections 10 and 11. The busway section 10 includes a housing of generally rectangular cross-section of relatively thin sheet metallic material comprising a pair of generally C-shaped cross-section side members 12, 12' interconnected by top and bottom cover plates 13, only one shown. The busway section 11 likewise includes a pair of generally C-shaped cross-section side pieces 14, 14' interconnected by top and bottom cover plate members 15, 15'.

A plurality of relatively wide, thin, flat busbar conductors 17, each covered throughout the major portion of its length with a thin coating of insulation, are supported in side-by-side contacting relation in the busway section 10. A corresponding assembly of similar busbars 18 is supported in the busway section 11. The portions of the busbars 17 and 18 which meet and overlap at the junction of the sections 10 and 11 have been omitted in order to show the construction and the functioning of the housing connecting means. So far as the present invention is concerned, any desired method of interconnecting the busbar conductors may be used, such, for example, as the single-bolt type of joint shown in Patent 3,004,097 issued Oct. 10, 1961 and assigned to the same assignee as the present invention.

Thus, in the particular embodiment of the invention illustrated, the busbar conductors 17, as illustrated in dotted lines in FIGURE 2, include portions 17A projecting beyond the end of the housing of the section 10, such projecting end portions being provided with aligned openings 17B to receive a clamping bolt, not shown. Likewise, the busbar conductors 18 supported in section 11 include end portions 18A which project beyond the end of the housing of the section 11 and which include elongated slots 18B to permit the section 11 initially to be slid endwise into position with respect to the section 10, despite the presence of the connecting bolt aforementioned. Each of the housing side members 12, 12' have a semicircular cut-away portion 12A to permit the passage of the clamping bolt. Likewise, the housing side members 14, 14' have a similar semi-circular cut-away portion 14A to also clear the clamping bolt.

For the purpose of cooperating with the joint cover member to be described, the housing side members 12 and 12' are provided with elongated apertures or slots 20 and 21, the slot 21 being of slightly greater length than the slot 20 for a purpose to be described. Likewise, the side members 14, 14' of the section 11 are provided with elongated apertures or slots 22, 23 and the slot 23 is made slightly longer than the slot 22. In addition, the side members 12 and 12' are provided with a series of transversely extending elongated apertures or slots 24 and the corresponding portions of the housing sides 14 and 14' are provided with corresponding openings or slots 25.

The housing of the busway sections 10 and 11 are adapted to be interconnected by means of the joint cover member 26 shown in FIGURE 1. The joint cover 26 is of a generally planar sheet metal construction having downwardly turned flange portions 27 at opposite edges thereof. The cover 26 includes a pair of tabs 20A and 21A corresponding in length to the apertures 20 and 21 respectively. The housing 26 likewise is provided at the opposite end with a pair of tabs 22A and 23A corresponding in size and location to the slots of 22, and 23. Intermediate these pairs of tabs, a plurality of rectangular openings or slots 30, 31, 32 and 33 are provided to cooperate with the slots 24, 25, in a manner to be described. In addition, the cover member 26 is provided with eight bolt receiving holes 40 corresponding in position to similar holes 42 in the busway sections 10 and 11.

*Method of assembly*

Having described the constructional features of my invention, the method of utilizing the same will now be described, referring particularly to FIGURE 2. In this figure, the busway sections 10 and 11 are shown in a position in which they are slightly out of lengthwise adjusted relation, and it is desired to bring them into the proper endwise adjusted relation and to attach them together. It will be appreciated that at this time the exposed busbar ends of the busbar 17 are in overlapping side-by-side engagement with corresponding exposed busbar ends of the busbars 18.

In accordance with applicant's novel method of assembly, the joint cover 26 is attached in a preliminary manner by inserting bolts 44 through holes 40 in the cover 26 and into holes 42 of the busway section 10 and threading them into suitable retaining means such as the nuts 46 welded to the inner surface of the housing of the section 10. The tabs 20A and 21A are inserted into the corresponding openings 20 and 21 of the section 10. Since the housings 10 and 11 are not yet in the proper adjusted relation, however, the tabs 22A and 23A do not line up with the corresponding openings 22, 23 of the housing 11. As indicated in FIGURE 2, therefore, the tabs 22A and 23A will rest on portions of the side members 14, 14' of the section 11. The bolts 48 are next inserted in the pair of openings 42 adjacent the end of the housing sides of the busway section 10 and threaded into retaining nuts 50 welded or suitably attached to the underside of the housing adjacent these openings. The bolts 48 are then tightened to exert a slight bias on the cover member 26, urging the tabs 22A and 23A against the side members 14, 14' of the housing of the section 11.

Since the sections are not in the proper lengthwise spaced relation, the apertures 30, 31, 32, and 33 will be out of alignment with the corresponding apertures 24, 25 of the busway sections 10 and 11. Therefore, a suitable tool, such as a conventional screwdriver or prybar may be inserted through one of the slots 32, 33, and into one of the slots 25 and then pivoted about the slot 25 to draw the two housing sections toward each other. This action forces the sections 10 and 11 closer together so that the openings 32, 33 are then adjacent the next succeeding openings 25. Accordingly, the tool may be removed and reinserted through the same aperture in the cover but by changing its angle, it can pick up the next succeeding openings 25, and the process repeated until the tab members 22A and 23A finally drop into the corresponding openings 22, 23, under the bias created in the cover 26 by the pre-tightening of the bolts 44 and 48. Once this occurs, the cover 26 will then act as a splice and spacer plate, maintaining the sections 10 and 11 in proper alignment endwise, permitting the bolts 44 and 48 to be tightened and correpsonding bolts to be inserted in the corresponding openings connecting the cover 26 to the section 11. When this is done, the busbar clamping bolt, not shown, extending through the openings 17B and 18B may be tightened, electrically interconnecting the busbar ends.

In the prefered form of the invention, the tabs and openings described are symmetrically positioned in the cover 26 and in the busway sections 10 and 11 so that the cover 26 may be initially attached to either one of the sections as may be desired or convenient, and the assembly process will be the same. Also, similar openings 20, 24, 42, etc. and welded nuts 46 are preferably provided at the opposite side of the housings and a second cover, not shown, similar to cover 26 is used therewith in a manner similar to that described in connection with cover 26.

It is another important feature of the invention that the tabs 20A and 22A are made of a different dimension from the tabs 21A, 23A and their corresponding apertures. Because of this construction, if by chance the wrong ends of two housings are brought together, it will be found that the cover 26 cannot be made to engage the required openings corresponding to the described tabs, since in this case, there will be a short and a long opening on the same side of the assembly. This provides a polarizing means, and gives an indication of error to the installer, permitting its correction before any damage has been caused.

Although the invention has been shown in a particular embodiment, it will be readily apparent that many modifications thereof may readily be made. Thus, for example, polarization may be achieved in other ways. Accordingly, for instance, I may achieve polarization by altering the spacing between the tabs 20A, 22A at one side of the assembly compared to the spacing between the corresponding tabs at the other side. Likewise, such polarization may be obtained in other ways, such as by arranging two said tabs to extend at right angles to the diretcion of the other two, etc.

A preferred form, utilized in the commercial embodiment, for example, utilizes only two tabs, both along the same side of the joint cover, and two slots in the housing. Obviously, the busway sections must be arranged so that the slots in each housing are on the same side in order to mount the cover properly.

In addition, if a greater distance of possible travel is desired in the adjusting operation, I may provide another opening similar to 32 and spaced therefrom in the direction of the second busway section, which could be used to provide a first amount of movement, bring the aperture 32 into operative position, following which the aperture 32 would be used.

It will also be apparent that the particular housing configuration and busbar arrangement may be varied without altering the applicability of the invention. I, therefore, intend to cover all such modifications of the invention as fall within the true spirit and scope of my invention.

What I claim as new and desire to secure by Letters Patent of the United States is:

1. Electric power busway apparatus comprising:
  (a) first and second elongated busway sections, each of said sections comprising an elongated generally rectangular cross-section housing and a plurality of elongated parallel busbar conductors supported in insulated relation therein, said busway section housings being in co-planar end-to-end aligned abutting relation;
  (b) said first busway section housing having a first portion overlapping a second portion of said second busway section housing;
  (c) said first portion of said first busway section housing having at least a first aperture therein;
  (d) said second portion of said second busway section housing having a plurality of closely spaced second apertures therein, one of said second apertures being positioned to be substantially in register with said first aperture when said housings are in substantially end-to-end abutting relation and the remaining ones of said second apertures being aligned with said aperture in a row extending longitudinally of said second busway section housing, said apertures comprising means for providing limited movement of said housings relative to each other for bringing said housings into said end-to-end aligned abutting relation;
  (e) interengaging means on said first portion of said first busway section housing and said second portion of said second busway section housing, said interengaging means preventing relative sliding movement of said housings when in said end-to-end aligned abutting relation; and
  (f) fastening means securing said first portion of said first busway section housing to said second portion of said second busway section housing whereby said first busway section housing is secured to said second busway section housing while said housings are being maintained in said end-to-end aligned abutting relation by said interengaging means.

2. Electric power busway apparatus as set forth in claim 1, said interengaging means comprising a projection on at least one of said housings and an aperture in at least the other of said housings into which said projection is received when said busway section housings are in said end-to-end aligned abutting relation.

3. Electric busway apparatus comprising:
  (a) first and second elongated busway sections, each of said sections comprising an elongated generally rectangular cross-section housing and a plurality of elongated parallel busbar conductors supported in insulated relation therein, said busway sections being in end-to-end aligned abutting relation;
  (b) said busway section housings each including at least one end portion extending in co-planar relation;
  (c) a generally planar joint cover member;
  (d) means removably connecting said cover member to one of said end portions, said cover member when connected to said end portion having a part thereof extending beyond said end portion;
  (e) said projecting part of said cover member having at least one first aperture therein;
  (f) the other of said end portions having a plurality of closely spaced second apertures in alignment in a row extending longitudinally of said busway section housing, one of said second apertures being in substantial alignment with said one aperture when said first and second busway sections are in substantial end-to-end abutting relation, said apertures comprising means for providing limited movement of said sections relative to each other for bringing said sections into said end-to-end aligned abutting relation;
  (g) interengaging means on said cover member and said other of said end portions of said busway housings, said interengaging means preventing relative sliding movement of said busway sections when in said end-to-end aligned abutting relation; and
  (h) fastening means securing said cover member to said other of said end portions of said busway housings whereby said first busway section is secured to said second busway section while said sections are being maintained in said end-to-end aligned abutting relation by said interengaging means.

4. Electric power busway apparatus as set forth in claim 3 wherein said interengaging means comprises interengaging portions movable into and out of interengaging relation by movement at right angles to the length of said busway housings.

5. Electric power busway apparatus as set forth in claim 3 wherein said cover member and said other of said end portions of said busway housings include polarizing means whereby said cover member prevents connection of said one housing end portion to a housing end portion similar to said other housing end portion in all respects except for said polarizing means.

References Cited

UNITED STATES PATENTS 3,004,096 10/1961 Rowe _____ 174—88
3,189,680 6/1965 Stanback _____ 174—68

FOREIGN PATENTS 229,559 7/1960 Australia.

LARAMIE E. ASKIN, *Primary Examiner.*